(12) United States Patent
Yan et al.

(10) Patent No.: US 12,100,833 B2
(45) Date of Patent: Sep. 24, 2024

(54) HOLLOW/POROUS SILICON-BASED COMPOSITE MATERIAL AND PREPARATION METHOD THEREOF

(71) Applicant: Guangdong Kaijin New Energy Technology Co., Ltd., Dongguan (CN)

(72) Inventors: Luo Yan, Guangdong (CN); Anhua Zheng, Guangdong (CN)

(73) Assignee: GUANGDONG KAIJIN NEW ENERGY TECHNOLOGY CO., LTD., Dongguan (CN)

(*) Notice: Subject to any disclaimer, the term of this patent is extended or adjusted under 35 U.S.C. 154(b) by 479 days.

(21) Appl. No.: 17/316,673

(22) Filed: May 10, 2021

(65) Prior Publication Data
US 2021/0273221 A1    Sep. 2, 2021

Related U.S. Application Data (63) Continuation of application No. PCT/CN2018/123634, filed on Dec. 25, 2018.

(30) Foreign Application Priority Data

Nov. 13, 2018    (CN) .......................... 201811347949.3

(51) Int. Cl.
*H01M 4/38*     (2006.01)
*H01M 4/36*     (2006.01)
(Continued)

(52) U.S. Cl.
CPC .......... *H01M 4/366* (2013.01); *H01M 4/386* (2013.01); *H01M 4/625* (2013.01); *B82Y 30/00* (2013.01);
(Continued)

(58) Field of Classification Search
CPC ....... H01M 4/362; H01M 4/366; H01M 4/386
See application file for complete search history.

(56) References Cited

U.S. PATENT DOCUMENTS

2019/0074506 A1*  3/2019  Troegel ................. H01M 4/133
2022/0310989 A1*  9/2022  Zheng ............... H01M 10/0525

FOREIGN PATENT DOCUMENTS

CN    102154659 A  *  8/2011
CN    105591108 A  *  5/2016
(Continued)

OTHER PUBLICATIONS

Translation Copy of CN-102154659-A (Year: 2012).*
(Continued)

*Primary Examiner* — Hoa (Holly) Le
(74) *Attorney, Agent, or Firm* — Andrew C. Cheng (57) ABSTRACT

A hollow/porous silicon-based composite material includes a hollow/porous structure, a silicon-carbon composite layer and a carbon coating layer. The silicon-carbon composite layer is formed by uniformly dispersing nano silicon/silicon oxide in a conductive carbon mesh formed by high-temperature pyrolysis of a binder. The composite material is prepared by uniformly mixing nano silicon/silicon oxide, the binder and the salt, and then carrying out spray granulation, high-temperature sintering, water washing for desalination, and a coating treatment. The grain growth of the silicon material is slowed down during the heat treatment process, the pulverization of the material is effectively avoided, the volume expansion effect of the silicon-based material is alleviated, the cycle performance of the silicon-based material is improved, and the conductivity and rate performance of the material is enhanced. The silicon-based composite (Continued)

material is a silicon-carbon anode material for lithium ion batteries with high first-cycle efficiency, low expansion and long cycle.

9 Claims, 3 Drawing Sheets

(51) Int. Cl.
  *H01M 4/62* (2006.01)
  *B82Y 30/00* (2011.01)
  *B82Y 40/00* (2011.01)
  *H01M 10/0525* (2010.01)

(52) U.S. Cl.
  CPC .......... *B82Y 40/00* (2013.01); *H01M 10/0525* (2013.01)

(56) References Cited

FOREIGN PATENT DOCUMENTS

| CN | 106784707 | A | * | 5/2017 | |
|---|---|---|---|---|---|
| CN | 109216686 | B | * | 3/2021 | ........ H01M 10/0525 |
| CN | 112599778 | A | * | 4/2021 | |
| CN | 115818647 | A | * | 3/2023 | |

OTHER PUBLICATIONS

Translation Copy of CN-115818647 A (Year: 2023).*
Translation Copy of CN-105591108-A (Year: 2016).*
Translation Copy of CN-106784707-A (Year: 2017).*
Translation Copy of CN 109216686 B (Year: 2021).*

* cited by examiner

HOLLOW/POROUS SILICON-BASED COMPOSITE MATERIAL AND PREPARATION METHOD THEREOF

TECHNICAL FIELD

The invention relates to the technical field of new energy materials, in particular to a hollow/porous silicon-based composite material and a preparation method thereof.

Description of Related Art

Secondary batteries have been widely used in portable electronic products. However, with the development of miniaturized portable electronic products and the increasing demand for secondary batteries in the aviation, military and automotive industries, it is urgent to substantially improve both the capacity and energy density of the batteries. At present, the commercial anode materials are mainly graphite materials. However, graphite materials cannot meet demands of the market due to their low theoretical capacity (372 mAh/g). In recent years, people's attention has been paid on novel high specific capacity anode materials such as lithium storage metals and their oxides (such as Sn and Si) and lithium transition metal phosphides. Among the many novel high capacity anode materials, Si has become one of the most potential material for replacing graphite due to its high theoretical specific capacity (4200 mAh/g), but Si base is prone to cracking and pulverization due to its huge volume effect during charge and discharge, thereby losing contact with the current collector, resulting in a sharp drop in cycle performance. Therefore, reducing the volume expansion effect and improving the cycle performance are of great significance to the application of silicon materials in lithium-ion batteries.

In the prior art, Chinese Patent Publication No. CN105552323A discloses a silicon/silicon oxycarbide/carbon anode material and its preparation method and application, where ultra-small siloxycarbon nanoparticles are uniformly dispersed in the carbon matrix as the buffer matrix, while silicon nanoparticles are evenly embedded in the carbon/siloxycarbon buffer matrix. Although the anode active material has high capacity and good cycle performance, its first-cycle efficiency is low, which limits its application in lithium-ion batteries. Chinese patent Publication No. CN106374088A discloses a method for preparing a silicon-carbon composite material by using magnesium thermal reduction process, where a silicon source (silicon dioxide) and an organic carbon source are dispersed in a solvent and ball milled and dried to obtain a silicon dioxide-carbon precursor composite material, and then the precursor and magnesium powder are mixed and subjected to magnesium thermal reduction reaction, pickling, water washing, and drying, thus obtaining the silicon-carbon composite material. The anode material shows low first-cycle efficiency because the porous structure of the material is obtained by the environmentally unfriendly method of magnesium thermal reduction and pickling, and it is difficult to control the process of magnesium thermal reduction reaction and pickling, causing lots of reaction by-product residuals.

Thus, it is indeed desired to develop a hollow/porous silicon-based composite material that can be used in lithium-ion batteries, a silicon-carbon anode material for lithium ion batteries with advantages of high first-cycle efficiency, low expansion, long cycle, etc. and a preparation method thereof, to overcome such technical difficulties in the prior art that silicon-based materials have a huge volume effect during charge and discharge, and are prone to cracking and pulverization, thereby losing contact with the current collector and further causing a sharp drop in cycle performance, and that the large volume effect and low conductivity of the silicon-based anode active materials lead to its poor cycle performance and poor rate performance.

SUMMARY OF THE INVENTION

In view of the above-mentioned shortcomings of the prior art, the objective of the invention is to provide a hollow/porous silicon-based composite material and a preparation method thereof. The silicon-based composite material is a silicon-carbon anode material for lithium ion batteries with the advantages of high first-cycle efficiency, low expansion and long cycle. According to the invention, the grain growth of the silicon materials slowed down during the heat treatment process, the pulverization of the material is effectively avoided during the cycle, the volume expansion effect of the silicon-based material is alleviated, the cycle performance of the silicon-based material is improved, and the conductivity and rate performance of the material can be enhanced.

To achieve the above objective, the technical solutions of the invention are as follows:

A hollow/porous silicon-based composite material, including a hollow/porous structure, a silicon-carbon composite layer and a coating layer, wherein the silicon-carbon composite layer is formed by uniformly dispersing nano silicon/silicon oxide in a conductive carbon mesh.

Preferably, the particle size D50 of the hollow/porous silicon-based composite material is 1-20 μm, more preferably 2-15 μm, particularly preferably 2-10 μm.

Preferably, the specific surface area of the hollow/porous silicon-based composite material is 1-30 $m^2/g$, more preferably 2-20 $m^2/g$, particularly preferably 2-8 $m^2/g$.

Preferably, the true density of the hollow/porous silicon-based composite material is 1-3 $g/cm^3$, more preferably 1.5-2.5 $g/cm^3$, particularly preferably 2.0-2.5 $g/cm^3$.

Preferably, the center of the hollow/porous silicon-based composite material is a hollow structure or a large-sized composite material composed of a plurality of small-sized hollow/porous secondary particles. The hollow/porous structure can effectively alleviate the volume effect of silicon-based material during the charge and discharge process, thereby effectively avoiding the pulverization of the material during the cycle. The binder can function as a good carbon conductive mesh after high-temperature carbonization, can enhance the conductivity of the material, improve the rate performance of the material, alleviate the volume expansion effect of the silicon-based material and improve the cycle performance of the material.

Preferably, cavities inside the hollow/porous silicon-based composite material account for 10-80% of the total volume of the composite material, more preferably 15-70%, particularly preferably 20-50%.

Preferably, the cavities in the secondary particles account for 10-80% of the total volume of the secondary particles, more preferably 15-70%, particularly preferably 20-50%; the particle size D50 of the secondary particles is 1-10 μm, more preferably 2-8 μm, particularly preferably 2-5 μm.

Preferably, the conductive carbon mesh in the silicon-carbon composite layer is formed by high-temperature pyrolysis of a binder; the coating layer is a carbon coating layer; the carbon coating layer includes at least one layer, and the thickness of its single layer is 0.2-3 μm, more preferably 0.2-2 μm, particularly preferably 0.2-1 μm.

A preparation method of the aforementioned hollow/porous silicon-based composite material of the invention, including the following Steps:

S1: adding a nano silicon material, a binder and a salt to the solvent, mixing and dispersing uniformly by a high-speed disperser to form a slurry, and spray drying the slurry, thus obtaining a solid silicon-based composite material precursor;

S2: sintering the solid silicon-based composite material precursor at a temperature between 500° C. and 1200° C. under a protective atmosphere to carbonize the binder to obtain a silicon-carbon composite layer; and then carrying out water washing for desalination, and then performing filtering and drying treatment, thus obtaining a hollow/porous silicon-based composite material precursor; and S3: carrying out carbon coating on the hollow/porous silicon-based composite material precursor, thus obtaining the hollow/porous silicon-based composite material.

Preferably, in Step S1, the nano silicon material is nano silicon or nano silicon oxide ($SiO_x$); the nano silicon is single-crystal nano silicon, polycrystalline nano silicon or amorphous nano silicon; X in nano silicon oxide ($SiO_x$) is 0.8-1.5, preferably 0.8-1.3, particularly preferably 0.8-1.1; the particle size D50 of the silicon material is 5-300 nm, more preferably 10-200 nm, particularly preferably 10-100 nm; the silicon material includes single-crystal or polycrystalline silicon with a grain size of 1-40 nm, more preferably 2-20 nm, particularly preferably 2-10 nm.

Preferably, the binder in Step S1 includes one or more of sucrose, glucose, citric acid, polypyrrolidone and PVDF; the mass ratio of the nano silicon to the binder is 60:40-99:1.

Preferably, the solvent in Step S1 is an organic solvent, including one or more of an alcohol solvent, a ketone solvent, an alkane solvent, N-methylpyrrolidone, tetrahydrofuran, and toluene; the alcohol solvent includes one or more of ethanol, methanol, propanol, ethylene glycol, isopropanol, n-octanol, propenol, and octanol; the ketone solvent includes acetone, methyl methyl ethyl ketone, methyl isobutyl ketone, methyl ethyl ketone, methyl isoacetone, cyclohexanone, and methyl hexanone; the alkane solvent includes cyclohexane, n-hexane, isoheptane, 3,3-dimethylpentane, and 3-methylhexane; the solvent is added to control the solid content of the slurry to 5-50%.

Preferably, the salt in Step S1 is a salt that is soluble in water and insoluble/slightly soluble in organic solvents, and the salt includes one or more of $Na_2CO_3$, $Ca(NO_2)_2$, NaCl, KCl, $CuCl_2$, $NiCl_2$, $FeSO_4$, $MgSO_4$, and $CuSO_4$; the mass ratio of the nano silicon material to the salt is 1:99-99:1. A hollow/porous structure is constructed on the basis of the principle that the salt is soluble in water but not soluble in organic solvents. The size and volume ratio of the hollow/porous structure inside the composite material are controlled effectively by controlling the particle size and amount of the salt added; in addition, water washing and filtration are carried out in the subsequent desalination process, which is environmentally friendly and pollution-free. The salt not only reserves space in the material to maintain a hollow/porous structure inside the material, but also forms molten salt to absorb heat during the heat treatment process, which slows down the grain growth of the silicon material during the heat treatment process.

Preferably, in Step S2, the sintering process is static sintering or dynamic sintering, equipment used for the static sintering is one of a box furnace, a roller kiln, and a pusher kiln, and equipment used for the dynamic sintering is a rotary sintering furnace; the protective gas includes one or more of nitrogen, argon, and argon-hydrogen mixed gas; the sintering process includes heating up to 500-1200° C. at a rate of 1-15° C./min under a protective atmosphere, maintaining the temperature for 0.5-20h, and cooling to room temperature naturally.

Preferably, in Step S3, the carbon coating is high-temperature pyrolysis carbon coating; the carbon coating is one-step carbon coating or two-step carbon coating, and in the case of two-step carbon coating, the coating amount of the second carbon coating process is 0.1-10 times, by mass, that of the first carbon coating process; a coating layer is formed by organic pyrolysis carbon, and the thickness of the coating layer is 10-2000 nm, more preferably 10-1500 nm, and particularly preferably 10-1000 nm. Two-step carbon coating can be 2-step liquid-phase coating or 2-step gas-phase coating, or includes a liquid-phase carbon coating process and a gas-phase carbon coating process following the liquid-phase carbon coating process or includes a gas-phase carbon coating process and a liquid-phase carbon coating process following the gas-phase carbon coating process.

Preferably, the carbon coating in Step S3 is liquid-phase carbon coating or gas-phase carbon coating, wherein the liquid-phase carbon coating process includes: uniformly mixing and dispersing an organic carbon source, a to-be-coated material, and a solvent by a high-speed disperser to form a slurry, controlling the solid content of the slurry to 5-50% by adjusting the amount of the solvent added, carrying out spray drying and heat treatment on the slurry, introducing a high-purity protective gas into the atmosphere furnace, heating up to 400-1200° C. at a heating rate of =10° C. for sintering, maintaining the temperature for 0.5-10h, and cooling to room temperature naturally, thus obtaining a liquid-phase coating product. The amount of the organic carbon source added is based on that the mass of the organic pyrolysis carbon accounts for 1-99 wt % of the total mass of the composite material formed by the organic pyrolysis carbon and the to-be-coated material.

More preferably, when the carbon coating is liquid-phase carbon coating, the organic carbon source includes one or more of sucrose, glucose, citric acid, phenolic resin, epoxy resin, pitch, polypyrrole, polypyrrolidone, polyaniline, polyacrylonitrile, polydopamine, and polyvinyl alcohol; the solvent includes one or more of an alcohol solvent, a ketone solvent, an alkane solvent, N-methylpyrrolidone, tetrahydrofuran, and toluene; the alcohol solvent includes one or more of ethanol, methanol, ethylene glycol, isopropanol, n-octanol, propenol, and octanol; the ketone solvent includes acetone, methyl methyl ethyl ketone, methyl isobutyl ketone, methyl ethyl ketone, methyl isoacetone, cyclohexanone, and methyl hexanone; the alkane solvent includes cyclohexane, n-hexane, isoheptane, 3,3-dimethylpentane, and 3-methylhexane; the protective gas includes one or more of nitrogen, argon, and argon-hydrogen mixed gas;

Preferably, the carbon coating in Step S3 is liquid-phase carbon coating or gas-phase carbon coating, wherein the gas-phase carbon coating process includes: placing a to-be-coated material in a CVD furnace, introducing a protective gas, heating up to 500-1200° C. at a rate of 1-15° C./min, introducing an organic carbon source gas at an inlet rate of 0.5-20.0 L/min, holding the temperature for 0.5-20h, and cooling to room temperature naturally, thus obtaining a gas-phase coating product.

More preferably, the CVD furnace is a rotary furnace with a rotation speed of 0.2-5.0 rpm; the protective gas includes one or more of nitrogen, helium, neon, argon, krypton, and xenon; the organic carbon source gas is one or more of methane, propane, isopropane, butane, isobutane, ethylene, propylene, acetylene, butene, vinyl chloride, vinyl fluoride, vinyl difluoride, ethyl chloride, fluoroethane, difluoroethane, methyl chloride, fluoromethane, difluoromethane, trifluoromethane, methylamine, formaldehyde, benzene, toluene, xylene, styrene, and phenol.

The invention has the following beneficial effects as compared with the prior art.

1. The hollow/porous silicon-based composite material of the invention includes a hollow/porous structure, a silicon-carbon composite layer and a coating layer. The silicon-carbon composite layer is composed of nano silicon/silicon oxide uniformly dispersed in a conductive carbon mesh; the internal hollow/porous structure can effectively alleviate the volume effect of silicon-based material during the charge and discharge process, thereby effectively avoiding the pulverization of the material during the cycle and improving the cycle performance of the material. The binder can function as a good carbon conductive mesh after high-temperature carbonization, can enhance the conductivity of the material, improve the rate performance of the material, alleviate the volume expansion effect of silicon-based materials and improve the cycle performance. The salt not only reserves space in the material to maintain a hollow/porous structure inside the material, but also forms molten salt to absorb heat during the heat treatment process, which slows down the grain growth of the silicon material during the heat treatment process.

2. The hollow/porous silicon-based composite material of the invention is prepared by the steps of first uniformly bonding nano silicon/silicon oxide on the salt, carrying out high-temperature sintering to carbonize the binder to obtain a silicon-carbon composite layer, and then carrying out water washing for desalination to obtain a hollow/porous structure, and finally carrying out coating process. The lithium ion battery prepared by using this material can show good cycle performance and rate performance.

The above is an overview of the technical solutions of the invention. The following is a further description of the invention with reference to the drawings and specific embodiments.

DETAILED DESCRIPTION OF THE INVENTION

Figure 1:
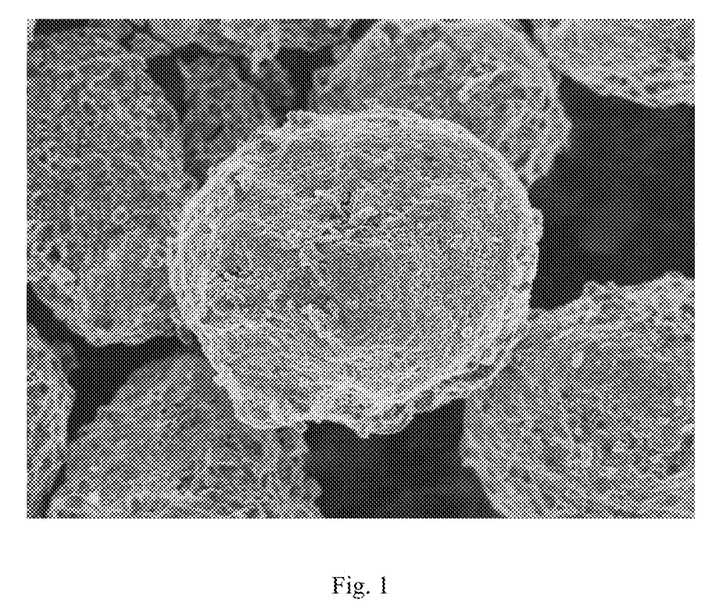
FIG. 1 is an SEM image of a silicon-based composite material in Example 4 of the present invention.
Figure 2:
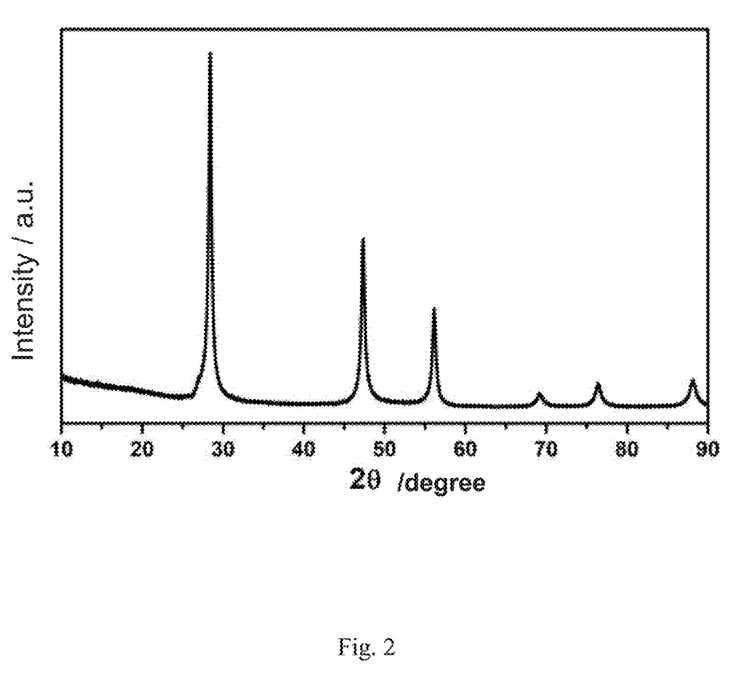
FIG. 2 is an XRD pattern of the silicon-based composite material in Example 4 of the present invention.
Figure 3:
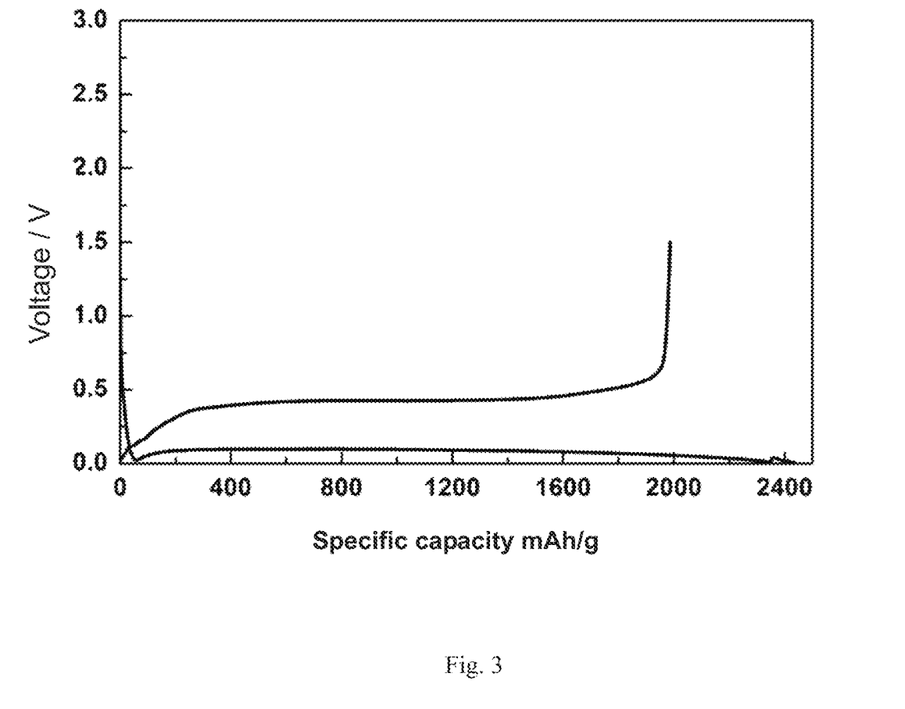
FIG. 3 is a first charge-discharge curve of the silicon-based composite material in Example 4 of the present invention.
Figure 4:
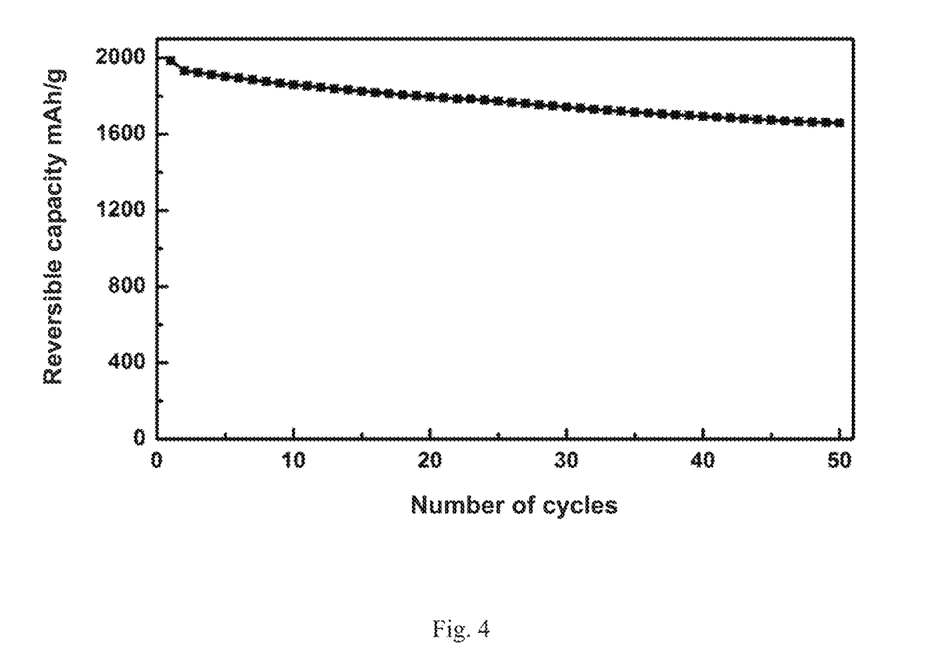
FIG. 4 is a cycle performance curve of the silicon-based composite material in Example 4 of the present invention.
Figure 5:
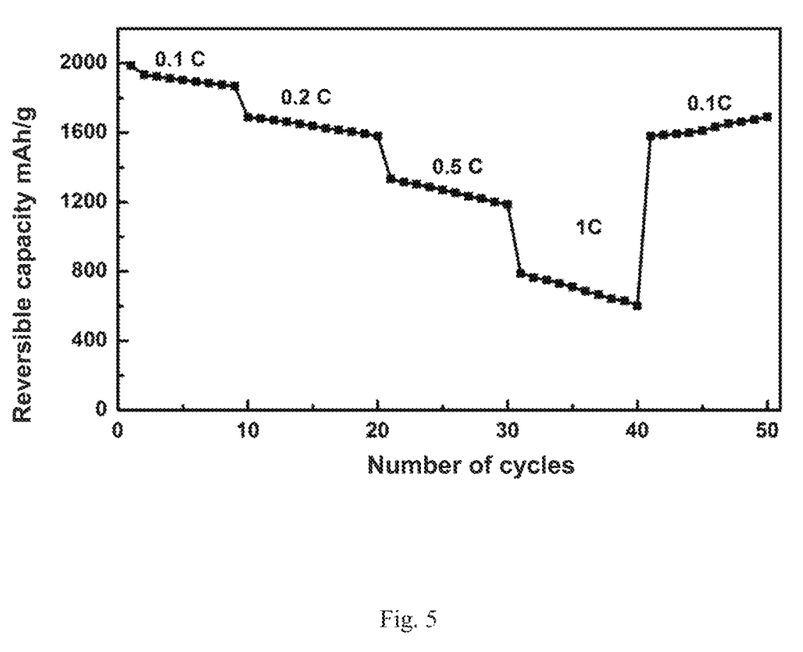
FIG. 5 is a rate performance curve of the silicon-based composite material in Example 4 of the present invention.

In order to make the objectives, technical solutions, and advantages of the invention clearer, a detailed description will be given below in conjunction with embodiments and drawings. It should be understood that the specific embodiments described here are only used to explain the invention and not to limit the scope of the invention. Some non-essential changes or adjustments made by those skilled in the art with reference to the embodiments of the invention still fall within the scope of the invention.

Comparative Example 1

20 g of nano silicon material with a particle size D50 of 50 nm and 4 g of sucrose were added to 150 g of alcohol, and mixed and dispersed uniformly by a high-speed disperser to form a slurry. The slurry was spray-dried to obtain a solid silicon-based composite material precursor. The obtained solid silicon-based composite material precursor was heat-treated, a high-purity protective gas for example nitrogen was introduced into an atmosphere furnace, and the precursor was heated up to 1050° C. at a rate of 1° C./min and maintained at this temperature for 5h, and then naturally cooled to room temperature. Next, 30% (calculated based on the percentage of the mass of the organic pyrolysis carbon to the total mass of the silicon-based composite material) of pitch, 70% of the solid silicon-based composite material precursor and alcohol are mixed and dispersed uniformly by the high-speed disperser to form a slurry. The solid content of the slurry was controlled to 20% by adjusting the amount of alcohol added. The slurry was then spray-dried and heat-treated. Specifically, a high-purity protective gas nitrogen was introduced into the atmosphere furnace and the dried slurry was heated up to 1050° C. at a rate of 1° C./min and maintained at 1050° C. for 5h, and then cooled to room temperature naturally, thereby obtaining a silicon-based composite material.

Comparative Example 2

20 g of nano silicon material with a particle size D50 of 150 nm and 4 g of citric acid were added to 100 g of alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, the precursor was heated up to 900° C. at a rate of 1° C./min and maintained at this temperature for 3h, and then naturally cooled to room temperature. The obtained solid silicon-based composite material precursor was placed in a rotary furnace of which the rotation speed was adjusted to 1.5 rpm, a protective gas nitrogen was introduced into the rotary furnace, and the precursor was heated up to 900° C. at a rate of 5° C./min; then, methane gas was introduced into the rotary furnace at a rate of 1.5 L/min for 20 min, the precursor was maintained in the rotary furnace at 900° C. for 3h and then cooled to room temperature naturally, thus obtaining a primary carbon coating product. 15% (calculated based on the percentage of the mass of the organic pyrolysis carbon to the total mass of the silicon-based composite material) of pitch, 85% of the primary carbon coating product and alcohol were firstly mixed and dispersed uniformly by the high-speed disperser to form a mixture; the solid content of the mixture was controlled to 20% by adjusting the amount of alcohol added, and the mixture was then spray-dried and heat-treated; a high-purity protective gas for example nitrogen was introduced into the atmosphere furnace, and the product was heated up to 900° C. at a rate of 1° C./min and maintained at this temperature for 3h, and then cooled to room temperature naturally, thus obtaining a silicon-based composite material.

Example 1

20 g of nano silicon material with a particle size D50 of 50 nm, 4 g of NaCl, and 4 g of sucrose were added to 150 g of alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, and the precursor was heated up to 1050° C. at a rate of 1° C./min and maintained at this temperature for 5h, and then naturally cooled to room temperature. The sintered material was then washed with water, filtered and dried to obtain a hollow/porous silicon-based composite material precursor. Next, 30% (calculated based on the percentage of the mass of the organic pyrolysis carbon to the total mass of the silicon-based composite material) of pitch, 70% of the hollow/porous silicon-based composite material precursor and alcohol were mixed and dispersed uniformly by the high-speed disperser to form a slurry; the solid content of the slurry was controlled to 20% by adjusting the amount of the alcohol added. The slurry was then spray-dried and heat-treated; a high-purity protective gas was introduced into the atmosphere furnace, and the product was heated up to 1050° C. at a rate of 1° C./min and maintained at this temperature for 5h, and then cooled to room temperature naturally, thus obtaining a silicon-based composite material.

Example 2

20 g of nano silicon material with a particle size D50 of 100 nm, 4 g of NaCl, and 4 g of sucrose were added to 150 g of alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, and the precursor was heated up to 900° C. at a rate of 1° C./min and maintained at this temperature for 3h, and then naturally cooled to room temperature. The sintered material was then washed with water, filtered and dried to obtain a hollow/porous silicon-based composite material precursor. Next, 30% (calculated based on the percentage of the mass of the organic pyrolysis carbon to the total mass of the silicon-based composite material) of pitch, 70% of the hollow/porous silicon-based composite material precursor and alcohol were mixed and dispersed uniformly by the high-speed disperser to form a slurry; the solid content of the slurry was controlled to 20% by adjusting the amount of alcohol added. The slurry was then spray-dried and heat-treated; a high-purity protective gas was introduced into the atmosphere furnace, and the product was heated up to 900° C. at a rate of 1° C./min and maintained at this temperature for 5h, and then cooled to room temperature naturally, thus obtaining a silicon-based composite material.

Example 3

20 g of nano silicon material with a particle size D50 of 150 nm, 6 g of Na2CO3, and 4 g of sucrose were added to 150 g of propyl alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, and the precursor was heated up to 900° C. at a rate of 1° C./min and maintained at this temperature for 3h, and then naturally cooled to room temperature. The sintered material was washed with water, filtered and dried to obtain a hollow/porous silicon-based composite material precursor. Next, 30% (calculated based on the percentage of the mass of the organic pyrolysis carbon to the total mass of the silicon-based composite material) of pitch, 70% of the hollow/porous silicon-based composite material precursor and alcohol were mixed and dispersed uniformly by the high-speed disperser to form a slurry; the solid content of the slurry was controlled to 20% by adjusting the amount of alcohol added. The slurry was then spray-dried and heat-treated; a high-purity protective gas was introduced into the atmosphere furnace, and the product was heated up to 900° C. at a rate of 1° C./min and maintained at this temperature for 5h, and then cooled to room temperature naturally, thus obtaining a silicon-based composite material.

Example 4

20 g of nano silicon material with a particle size D50 of 50 nm, 4 g of NaCl, and 4 g of citric acid were added to 100 g of alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, and the precursor was heated up to 900° C. at a rate of 1° C./min and maintained at this temperature for 3h, and then naturally cooled to room temperature. The sintered material was washed with water, filtered and dried to obtain a hollow/porous silicon-based composite material precursor. The obtained hollow/porous silicon-based composite material precursor was placed in a rotary furnace of which the rotation speed was adjusted to 1.5 rpm, a protective gas nitrogen was introduced into the rotary furnace, and the precursor was heated up to 900° C. at a rate of at 5° C./min; then, methane gas was introduced at a rate of 1.5 L/min for 20 min, the precursor was held at this temperature for 3h and cooled to room temperature naturally, thus obtaining a primary carbon coating product. 15% (calculated based on the percentage of the mass of the organic pyrolysis carbon to the total mass of the silicon-based composite material) pitch, 85% primary carbon coating product and alcohol were firstly mixed and dispersed uniformly by the high-speed disperser to form a mixture; the solid content of the mixture was controlled to 20% by adjusting the amount of alcohol added. The mixture was then spray-dried and heat-treated; a high-purity protective gas nitrogen was introduced into the atmosphere furnace, and the product was heated up to 900° C. at a rate of 1° C./min and maintained at this temperature for 3h, and then cooled to room temperature naturally, thus obtaining a silicon-based composite material.

Example 5

20 g of nano silicon material with a particle size D50 of 50 nm, 4 g of NaCl, and 4 g of citric acid were added to 100 g of alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, and the precursor was heated up to 900° C. at a rate of 1° C./min and maintained at this temperature for 3h, and then naturally cooled to room temperature. The sintered material was washed with water, filtered and dried to obtain a hollow/porous silicon-based composite material precursor. 15% (calculated based on the percentage of the mass of the organic pyrolysis carbon to the total mass of the silicon-based composite material) of pitch, 85% of the hollow/porous silicon-based composite material precursor and alcohol were firstly mixed and dispersed uniformly by the high-speed disperser to form a mixture; the solid content of the mixture was controlled to 20% by adjusting the amount of alcohol added. The mixture was then spray-dried and heat-treated; a high-purity protective gas was introduced into the atmosphere furnace, and the product was heated up to 900° C. at a rate of PC and maintained at this temperature for 3h, and then cooled to room temperature naturally, thus obtaining a primary carbon coating product. The obtained primary carbon coating product was placed in a rotary furnace, the rotation speed was adjusted to 1.5 rpm, a protective gas nitrogen was introduced, and the product was heated up to 900° C. at a rate of at 5° C./min; then, methane gas was introduced at a rate of 1.5 L/min for 20 min, and the precursor was held at this temperature for 2h and cooled to room temperature naturally, thus obtaining a silicon-based composite material.

Example 6

20 g of nano silicon material with a particle size D50 of 50 nm, 6 g of $Na_2CO_3$, and 4 g of citric acid were added to 100 g of alcohol, and mixed and dispersed uniformly by a high-speed disperser to form a slurry, and the slurry was spray-dried to obtain a solid silicon-based composite material precursor. The obtained solid silicon-based composite material precursor was heat-treated, a high-purity protective gas nitrogen was introduced into an atmosphere furnace, and the precursor was heated up to 900° C. at a rate of 1° C./min and maintained at this temperature for 3h, and then naturally cooled to room temperature. The sintered material was washed with water, filtered and dried to obtain a hollow/porous silicon-based composite material precursor. 15% (calculated based on the percentage of the mass of the organic pyrolysis carbon to the total mass of the silicon-based composite material) of pitch, 85% of the hollow/porous silicon-based composite material precursor and alcohol were firstly mixed and dispersed uniformly by the high-speed disperser to form a mixture; the solid content of the mixture was controlled to 20% by adjusting the amount of alcohol added. The mixture was then spray-dried and heat-treated; a high-purity protective gas was introduced into the atmosphere furnace, and the product was heated up to 900° C. at a rate of 1° C./min and maintained at this temperature for 3h, and then cooled to room temperature naturally, thus obtaining a primary carbon coating product. The obtained primary carbon coating product was placed in a rotary furnace of which the rotation speed was adjusted to 1.5 rpm, a protective gas nitrogen was introduced, and the product was heated up to 900° C. at a rate of at 5° C./min; then, methane gas was introduced at a rate of 1.5 L/min for 20 min, and the precursor was maintained at this temperature for 2h and cooled to room temperature naturally, thus obtaining a silicon-based composite material.

The following methods were used to test Comparative Examples 1 to 2 and Embodiments 1 to 6:

The materials prepared in Comparative Examples 1 to 2 and Examples 1 to 6 were taken as anode materials, and respectively mixed with a binder polyvinylidene fluoride (PVDF) and a conductive agent (Super-P) in a mass ratio of 70:15:15. An appropriate amount of N-methylpyrrolidone (NMP) was respectively added as a solvent to the obtained mixtures to prepare slurry. The slurry was applied to copper foils, and the copper foils were then vacuum dried and rolled to obtain anode pole pieces. Metal lithium sheets were used as the counter electrodes, 1 mol/L LiPF6 three-component mixed solvent (EC:DMC:EMC=1:1:1 (v/v)) was used as electrolyte, and polypropylene microporous membrane was used as the diaphragm; all these were assembled into CR2032 button batteries in a glove box full filled with inert gas. The charge and discharge tests for the button batteries were performed by 0.1 C constant current charge and discharge on the LANHE battery test system provided by Wuhan Landian Electronics Co., Ltd. at room temperature under a charge and discharge voltage between 0.005V and 1.5V.

The volume expansion rates of the materials were tested and calculated in the following way: Expansion rate=(pole piece thickness after 50 cycles-pole piece thickness before the cycle)/(pole piece thickness before the cycle-copper foil thickness)*100%.

The test results are shown in Table 1:

TABLE 1 shows the performance test evaluation results of Comparative Examples 1 to 2 and Examples 1 to 6.

| | $1^{st}$ reversible capacity (mAh/g) | Initial Coulombic efficiency | 50 cycle capacity retention rate | Expansion rate (%) |
|---|---|---|---|---|
| Comparative Example 1 | 1832.5 | 70.2 | 35.1 | 198.5 |
| Comparative Example 2 | 1735.6 | 73.5 | 42.3 | 193.2 |
| Embodiment 1 | 1865.3 | 75.2 | 72.2 | 186.3 |
| Embodiment 2 | 1875.6 | 77.6 | 77.3 | 185.4 |
| Embodiment 3 | 1857.6 | 78.2 | 81.8 | 182.1 |
| Embodiment 4 | 1986.7 | 81.5 | 83.5 | 169.2 |
| Embodiment 5 | 1965.2 | 78.6 | 82.5 | 175.3 |
| Embodiment 6 | 1932.5 | 80.2 | 82.8 | 172.5 |

Based on the disclosure and teaching of the foregoing specification, those skilled in the art to which the invention pertains can also make changes and modifications to the foregoing embodiments. Therefore, the above description is not a limitation of the invention, and the invention is not limited to the specific embodiments disclosed and described above. Some modifications and changes to the invention, such as variations, modifications, additions, or substitutions made by those of ordinary skill in the art within the essential scope of the embodiments on the equivalent replacement of various raw materials, the addition of auxiliary components, the selection of specific methods, etc., should also fall within the protection scope of the claims of the invention.

What is claimed is:

1. A preparation method of a hollow/porous silicon-based composite material which comprises a hollow/porous structure, a silicon-carbon composite layer and a coating layer, the method comprising the following Steps:

S1: adding a nano silicon material, a binder and a salt to a solvent, mixing and dispersing uniformly by a disperser to form a slurry, and spray drying the slurry to obtain a solid silicon-based composite material precursor, wherein the binder is carbonizable;

S2: sintering the solid silicon-based composite material precursor between 500° C. and 1200° C. under a protective atmosphere to carbonize the binder to obtain a silicon-carbon composite layer; and then carrying out water washing for desalination, and then performing filtering and drying treatment, thus obtaining a hollow/porous silicon-based composite material precursor; and S3: carrying out carbon coating on the hollow/porous silicon-based composite material precursor to obtain the hollow/porous silicon-based composite material.

2. The preparation method of the hollow/porous silicon-based composite material according to claim 1, wherein the nano silicon material is nano silicon or nano silicon oxide ($SiO_X$), X in nano $SiO_X$ is 0.8-1.5, and the nano silicon comprises any one or more of single-crystal nano silicon, polycrystalline nano silicon and amorphous nano silicon.

3. The preparation method of the hollow/porous silicon-based composite material according to claim 2, wherein the silicon material comprises single-crystal or polycrystalline silicon with a grain size of 1-40 nm, the particle size D50 of the silicon material is 5-300 nm.

4. The preparation method of the hollow/porous silicon-based composite material according to claim 1, wherein the binder comprises any one or more of sucrose, glucose, citric acid, polypyrrolidone, and PVDF; the mass ratio of the nano silicon to the binder is 60:40-99:1.

5. The preparation method of the hollow/porous silicon-based composite material according to claim 1, wherein the solvent is an organic solvent comprising one or more of an alcohol solvent, a ketone solvent, an alkane solvent, N-methylpyrrolidone, tetrahydrofuran, and toluene, wherein the alcohol solvent comprises one or more of ethanol, methanol, propanol, ethylene glycol, isopropanol, n-octanol, propenol, and octanol, the ketone solvent includes acetone, methyl methyl ethyl ketone, methyl isobutyl ketone, methyl ethyl ketone, methyl isoacetone, cyclohexanone, and methyl hexanone, and the alkane solvent includes cyclohexane, n-hexane, isoheptane, 3,3-dimethylpentane, and 3-methylhexane; the solvent is added to control the solid content of the slurry to 5-50%.

6. The preparation method of the hollow/porous silicon-based composite material according to claim 1, wherein the salt is soluble in water and insoluble/slightly soluble in organic solvents, the salt comprises one or more of $Na_2CO_3$, $Ca(NO_2)_2$, NaCl, KCl, $CuCl_2$, $NiCl_2$, $FeSO_4$, $MgSO_4$, and $CuSO_4$, and the mass ratio of the nano silicon material to the salt is 1:99-99:1.

7. The preparation method of the hollow/porous silicon-based composite material according to claim 1, wherein the carbon coating is high-temperature pyrolysis carbon coating which adopts one-step carbon coating or two-step carbon coating; in the case of two-step carbon coating, the coating amount of the second carbon coating process is 0.1-10 times, by mass, that of the first carbon coating process; the thickness of the coating layer formed by the carbon coating is 10-2000 nm.

8. The preparation method of the hollow/porous silicon-based composite material according to claim 1, wherein the carbon coating is liquid-phase carbon coating, the step of carrying out carbon coating comprising the following process:

uniformly mixing and dispersing an organic carbon source, a to-be-coated object, and a solvent by a disperser to form a slurry;

carrying out spray drying and heat treatment on the slurry;

introducing a protective gas into an atmosphere furnace, heating the atmosphere furnace to a temperature of 400-1200° C. at a heating rate of ≤10° C. for sintering, maintaining the temperature for 0.5-10h, and cooling to room temperature naturally, thus obtaining a liquid-phase coating product; wherein the amount of the organic carbon source added is the mass of the organic pyrolysis carbon which accounts for 1-99 wt % of the total mass of the composite material formed by the organic pyrolysis carbon and the to-be-coated material.

9. The preparation method of the hollow/porous silicon-based composite material according to claim 1, wherein the carbon coating is gas-phase carbon coating which comprises the following process:

placing a to-be-coated object in a CVD furnace, introducing a protective gas, heating up to a temperature of 500-1200° C. at a rate of 1-15° C./min, introducing an organic carbon source gas at an inlet rate of 0.5-20.0 L/min, holding the temperature for 0.5-20h, and cooling to room temperature naturally, thus obtaining a gas-phase coating product.

* * * * *